United States Patent [19]

Tan et al.

[11] Patent Number: 5,086,120
[45] Date of Patent: Feb. 4, 1992

[54] IONICALLY BLENDED MOLECULAR COMPOSITES

[75] Inventors: Loon-Seng Tan; Fred E. Arnold, both of Centerville, Ohio

[73] Assignee: The United States of America as represented by the Secretary of the Air Force, Washington, D.C.

[21] Appl. No.: 652,728

[22] Filed: Feb. 8, 1991

[51] Int. Cl.$^5$ .................... C08G 75/32; C08L 81/00
[52] U.S. Cl. .................... 525/183; 525/536; 525/540; 525/425; 525/432; 525/435; 528/337; 528/377
[58] Field of Search ............. 525/183, 536, 540, 435, 525/425, 432; 528/337, 377

[56] References Cited

U.S. PATENT DOCUMENTS

| | | | |
|---|---|---|---|
| 4,108,835 | 8/1978 | Arnold et al. | 528/183 |
| 4,207,407 | 6/1980 | Helminiak et al. | 525/425 |
| 4,377,546 | 3/1983 | Helminiak et al. | 264/232 |

Primary Examiner—Melvyn I. Marquis
Assistant Examiner—W. R. H. Clark
Attorney, Agent, or Firm—Charles E. Bricker; Donald J. Singer

[57] ABSTRACT

A molecular composite system consisting essentially of a para-oriented benzobisazole polymer and a matrix polymer, poly(2-acrylamido-2-methylpropanesulfonic acid).

5 Claims, No Drawings

IONICALLY BLENDED MOLECULAR COMPOSITES

RIGHTS OF THE GOVERNMENT

The invention described herein may be manufactured and used by or for the Government of the United States for all governmental purposes without the payment of any royalty.

BACKGROUND OF THE INVENTION

This invention relates to composite polymeric materials, particularly composite materials containing rod-like aromatic heterocyclic polymers dispersed in a polymeric matrix.

Chopped fiber reinforced plastics are currently being used in the fabrication of a wide variety of components. There are several disadvantages in the use of fiber for the reinforcement of plastic. In the case of chopped glass fibers, a large amount of fiber, generally a minimum of 30 percent by weight, is necessary for reinforcement because of the low reinforcing effect of the fiber. There is a practical processing limit on the effective fiber length. A macroscopically long fiber length is required with due regard for breaking or destruction of the fiber during processing, particularly molding. Composite materials containing chopped fibers are generally less processable than their non-reinforced counterparts. The shape of moldings is often limited to simple block or sheet forms. Films or filaments cannot be formed from chopped glass fiber-reinforced plastics. Other disadvantages of these materials include poor surface properties of molded articles, an anisotropy in dynamic properties, molding defects due to heterogeneity of the polymeric materials, and low cycle time in processing.

A need exists for high strength reinforced composites and a method for their manufacture which possess at least the following desirable prerequisites: (1) non-reliance on fiber reinforcement for the attainment of high strength properties; (2) circumvention of the complexities of current composite fabrication procedures; and (3) elimination of any possibility of fiber-polymer interface problems.

Various attempts have been made to overcome some of the above-described disadvantages of chopped-fiber reinforced Plastics. One approach described by Helminiak et al, U.S. Pat. Nos. 4,207,407 and 4,377,546, comprises the dispersion of an intrinsically rigid rod-like heterocyclic polymer in a flexible, coil-like heterocyclic polymer.

The above composites are referred to as molecular composites. While this approach represents a valuable contribution to the art, it has certain drawbacks. For example, poly(p-phenylene benzobisthiazole) (PBT) has superior mechanical properties and thermal stability. However, PBT degrades before it melts; therefore, processing of a composite containing PBT must be carried out in a solution state with an acid, such as methanesulfonic acid (MSA), as the solvent. Relatively few flexible coil polymers can be dissolved in or are stable in MSA, thus limiting the choice of matrix polymers. Molecular composites based on PBT and poly-2,5-benzimidazole (ABPBI) have been fabricated into fibers and thin films. However, ABPBI does not have a glass transition temperature ($T_g$). Therefore, molecular composites containing ABPBI are difficult to thermally consolidate into thicker specimens. To overcome this problem, thermoplastic matrices have been used so that the molecular composite films could be laminated. However, thicker specimens fabricated using thermoplastic matrices are limited to use at temperatures below the $T_g$ of the matrix polymer(s). Conventional thermoset resins, such as bismaleimides, epoxies and the like, are not stable in the acid medium used to process the rigid-rod polymer, and cannot be used as host matrices for molecular composites.

Another drawback to molecular composites has to do with the propensity of the rod-like materials to agglomerate. Serious agglomeration can lead to structural failure. Minor agglomeration can often be accomodated. What is desired is a molecular composite system in which there is interaction between the matrix polymer and the rod-like polymer sufficient to overcome any tendency toward phase separation.

Accordingly, it is an object of this invention to provide a novel molecular composite system.

Other objects, aspects and advantages of the present invention will become apparent to those skilled in the art from a reading of the following detailed description of the invention.

SUMMARY OF THE INVENTION

In accordance with the present invention, there is provided a molecular composite system consisting essentially of a para-oriented benzobisazole polymer and a matrix polymer, poly(2-acrylamido-2-methylpropanesulfonic acid).

The poly(2-acrylamido-2-methylpropanesulfonic acid) (hereinafter referred to as AMPS) has repeating units of the formula:

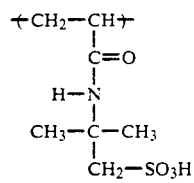

The AMPS is commercially available as its sodium salt:

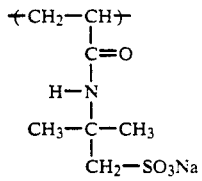

(hereinafter referred to as NaAMPS) under the tradename "Lubrizol 2420" from Lubrizol Corporation, Cleveland, Ohio. Lubrizol 2420 is available as an aqueous solution containing about 12.5% (w/v) NaAMPS homopolymer. The homopolymer can be isolated by pouring the solution into a water-absorbing solvent system such as toluene/methanol.

AMPS homopolymer is prepared in-situ in methanesulfonic acid (MSA) from NaAMPS as follows:

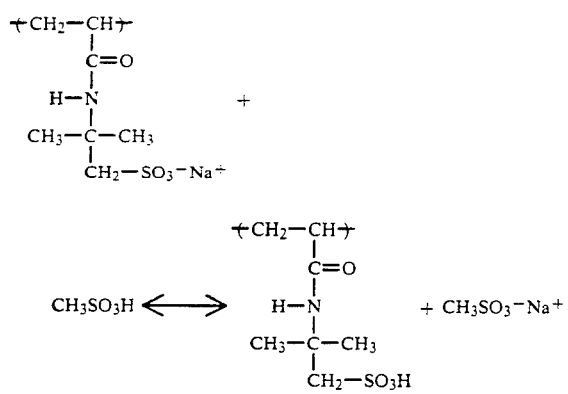

The para-oriented benzobisazole polymer can be any p-phenylene benzobisazole polymer. These polymers have repeating units of the general formula:

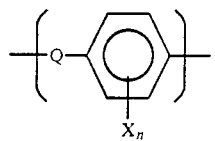

wherein n is 0, 1 or 2, X is an alkyl group having 1 to 4 carbon atoms or a benzazole group of the formula:

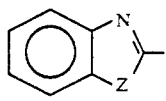

wherein Z is —O— or —S—; and Q is a benzobisazole group of the formula:

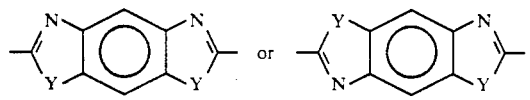

wherein Y is —O—, —S—, or —NH—.

The molecular composite of this invention is prepared by dissolving NaAMPS in MSA followed by the addition of a selected benzobisazole polymer. The ratio of AMPS to benzobisazole polymer can range from about 1:4 to about 10:1. The resulting mixture is agitated for about 3 to 30 days at room temperature or above. The critical concentration of AMPS plus benzobisazole polymer in MSA is about 8% (w/w). In contrast, the critical concentration of molecular composites prepared heretofore has been about 2-3%.

The resulting blend of materials is coagulated by pouring the agitated mixture into ice water. The precipitated molecular composite is then filtered, washed and dried. Films and fibers may be prepared by redissolving the molecular composite in MSA and extruding the resulting solution through a suitable die into a water bath.

The following examples illustrate the invention:

EXAMPLE I

Extraction of Poly(sodium 2-acrylamido-2-methyl-propanesulfonate)

About 120 ml of Lubrizol 2420 was slowly poured into a magnetically stirred solution of toluene (200 ml) and methanol (1000 ml). A white, waxy polymer precipitated. The polymer was collected by filtration (without suction) using a coarse fritted filter funnel and washed with toluene/methanol (v/v 5:1; 2×200 ml). It was then dried in vacuo at 70°–80° C. for 48 hours. About 15 g of NaAMPS homopolymer was obtained. Anal. Calc. for $NaC_7H_{12}O_4NS$: C, 36.67%; H, 5.28%; N, 6.11%; S, 13.98%. Found: C, 38.67%; H, 5.98%; N, 5.05%; S, 9.75%.

EXAMPLE II

Preparation of 52/48 (w/w) PBZT/AMPS Molecular Composite 1.953 g of NaAMPS homopolymer (equivalent to 1.953×207.24/229.23 or 1.766 g of AMPS homopolymer) was placed in a 150 ml polymerization vessel, followed by the addition of 50 ml of freshly distilled methanesulfonic acid (MSA). The resulting mixture was stirrred overnight under a stream of nitrogen. To this solution was added, in small portions, 1.950 g of poly (p-phenylene benzobisthiazole) (PBZT) polymer (intrinsic viscosity 21.4 dl/g in MSA at 30° C.). The resulting mixture was agitated for 21 days. (Stirring became increasingly difficult after addition of the PBZT due to the tremendous bulk viscosity. Stirring was performed intermittently to prevent overheating of the stirrer motor.) The final dark green blend was coagulated by pouring it into a 4 l. beaker containing about 2 l. of ice water. The color of the mixture changed immediately upon contacting the water from dark green to orange-red. The precipitated blend was chopped into fine fibers in a blender and washed with water until the filtrate was almost colorless and neutral to wet litmus paper. The resulting wet fibers were yellow. The wet yellow fibers were suction dried overnight. The resulting dry fibers, now red, were subjected to soxhlet extraction with methanol for about 20 hours, followed by drying in vacuo at about 50° C. for 24 hours. 3.35 g of PBZT/AMPS was obtained (about 90% of theoretical).

EXAMPLE III

Preparation of extruded film of PBZT/AMPS Molecular Composite

The polymer blend from Example II was redissolved in MSA under dry nitrogen atmosphere to form a 2.5% solution. The resulting solution was extruded through a coat hanger die onto the surface of a rotating stainless steel drum which was half-submerged in a deionized water bath. As the drum rotated, a thin layer of extruded solution coagulated into wet film. The coagulated film was washed free of MSA and wound, without overlapping, on a 6-inch diameter plastic pipe. It was dried in vacuo at 110° C. overnight.

The dried film had a thickness of about 6–10 μm. Shrinkage was about 10–15%. The dry film was orange-red in color. When contacted with water, the film turned yellow. This color change was reversible.

The processed film was coated with C/Pt and examined for possible phase-separation using scanning electron microscopy. The film appeared homogeneous.

There was no detectable phase separated morphology within 500 Å resolution. Wide angle X-ray flat film diffraction showed two weak diffraction rings with 3.5 and 12.5 Å d-spacings. These were attributed to PBZT. Thus, the molecular composite did exhibit a small degree of aggregation of the rod-like molecules, but without any evidence of gross phase separation.

In addition to the color change in the material when contacted with water, the material adopts a variety of colors when contacted with other liquids. The material was red in methylene chloride, orange-red in dry methanol, yellow in DMSO and brown in triethylamine. This chromatic variability was always reversible. It is believed that the chromatic variability can be explained in terms of acid-base equilibrium. In the AMPS-homopolymer/PBZT molecular composite, the PBZT polymer exists as a protonated species whose charges are counterbalanced by the sulfonate anions attached to the AMPS homopolymer. The red color of the material in the dry state is probably due to the mixture of protonated and unprotonated PBZT. Completely protonated PBZT, as in the case of PBZT/MSA solution, is yellow green. In an aqueous environment, the protons are immediately transferred from protonated benzobisthiazole units to water to form the hydronium ($H_3O^+$) ions. The resultant orange-yellow color is due to the neutral PBZT polymer. Thus, in a relatively less basic environment (e.g., $CH_2Cl_2$ and MeOH), the equilibrium is shifted towards protonated PBZT polymer; in a more basic environment (e.g., triethylamine), the equilibrium is shifted towards neutral PBZT polymer. The color of the material changes accordingly.

As noted previously, shrinkage in the molecular composite film of this invention was about 10-15%. In contrast, shrinkage in other molecular composite films is generally much greater. For example, a molecular composite film with about the same composition and using a thermoplastic matrix (nylon 66) exhibited 40-50% shrinkage. Such dimensional stability on drying is quite unusual.

The molecular composite of this invention can be used as a moisture indicator. As noted previously, the film prepared in Example III exhibited a reversible color change from orange-red to yellow when contacted with water.

Various modifications may be made to the invention as described without departing from the spirit of the invention or the scope of the appended claims.

We claim:

1. A molecular composite system consisting essentially of a para-oriented benzobisazole polymer and poly(2-acrylamido-2-methylpropanesulfonic acid).

2. The molecular composite system of claim 1 wherein the weight ratio of poly(2-acrylamido-2-methylpropanesulfonic acid) to benzobisazole polymer is about 1:4 to about 10:1.

3. The molecular composite system of claim 2 wherein said weight ratio is about 1:1.

4. The molecular composite system of claim 1 wherein said benzobisazole polymer is a p-phenylene benzobisazole polymer having repeating units of the formula:

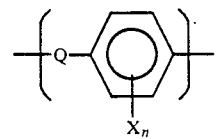

wherein n is 0, 1 or 2, X is an alkyl group having 1 to 4 carbon atoms or a benzazole group of the formula:

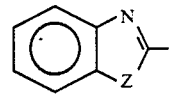

wherein Z is —O— or —S—; and Q is a benzobisazole group of the formula:

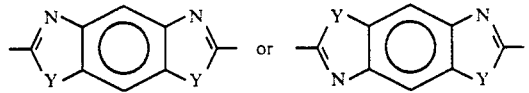

wherein Y is —O—, —S—, or —NH—.

5. The molecular composite system of claim 4 wherein said benzobisazole polymer is poly (p-phenylene benzobisthiazole).

* * * * *